Figure 1:
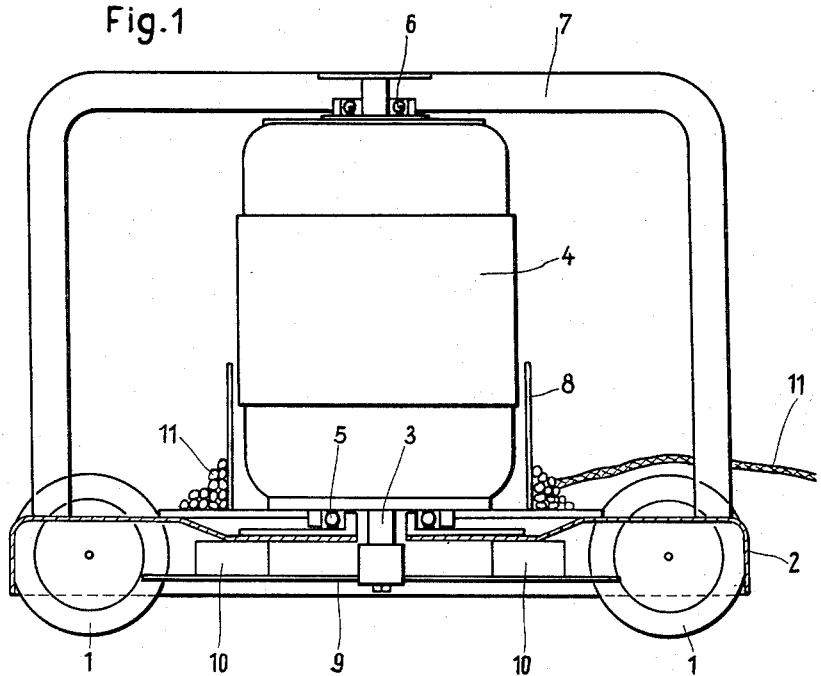

Feb. 12, 1963    H. BROZIAT    3,077,320
MOTOR-DRIVEN CABLE WINDING DEVICE
Filed June 6, 1960    2 Sheets-Sheet 1

INVENTOR.
HORST BROZIAT
BY Toulmin & Toulmin
Attorneys

Feb. 12, 1963   H. BROZIAT   3,077,320
MOTOR-DRIVEN CABLE WINDING DEVICE
Filed June 6, 1960   2 Sheets-Sheet 2

INVENTOR.
HORST BROZIAT
BY Toulmin & Toulmin
Attorneys

United States Patent Office 3,077,320
Patented Feb. 12, 1963

3,077,320
MOTOR-DRIVEN CABLE WINDING DEVICE
Horst Broziat, Radolfzeller Strasse 44,
Allensbach (Bodensee), Germany
Filed June 6, 1960, Ser. No. 34,101
Claims priority, application Germany June 24, 1959
3 Claims. (Cl. 242—86.5)

The present invention relates to a motor-driven rope or cable winding device.

Prior to this invention, such winding devices were driven either by a motor or a coil spring through a suitable gear.

The winding devices which are driven by a spring motor have the disadvantage that the peripheral force diminishes in proportion with the length of the cable wound thereon, and they therefore only permit the winding of a very limited length of cable. When unwinding the cable, the opposite effect occurs insofar as the more the cable is unwound, the greater will be the peripheral force, which may even reach a value aproaching or exceeding the tensile strength of the cable.

On the other hand, motor winches of the usual type have to be rather complicated and expensive in order to permit a properly elastic operation while maintaining a uniform torque.

It is an object of the present invention to provide a motor-driven device for winding and unwinding a cable which is of a very simple and inexpensive structure and easy to operate and permits cables of any desired length to be wound and unwound without any change in torque, and which also permits the cable to be withdrawn at any desired speed if this torque is being exceeded.

This object is attained according to the invention by mounting the motor housing which is connected to a cable drum so as to be rotatable about its central axis, and by either connectnig the motor housing or the drive shaft of the motor to a brake which produces a relative rotation between the two rotatable parts. The present invention is based upon the law of physics that each force produces an equal force in the opposite direction.

The brake device according to the invention which produces the rotation may consist of a fan wheel which is mounted on the motor shaft and is movable either in air or in a liquid, while an infinitely variable control may be attained by means of an adjustable propeller or a spring-controlled mechanical brake, particularly a slip coupling.

The device according to the invention may be applied to many different kinds of apparatus and it is especially suitable for winding up the cable of an electric lawn mower and for maintaining it at all times without slack.

If according to the invention the housing with the field winding of an electric motor as well as the armature with the motor shaft are rotatably mounted, and the motor housing is provided with a cable drum, while the motor shaft is provided with a brake for producing a slippage, for example, a fan wheel, both parts of the motor will rotate in opposite directions and with a different torque depending upon the amount of the slippage. Thus, in accordance with the amount of the slippage, a certain portion of the total output of the motor as furnished by the motor shaft will be utilized for rotating the motor housing.

The elastic operation of the device according to the invention permits the coiled-up cable to be easily unwound while the motor is running, provided that the tension applied upon the cable exceeds the torque of the motor.

According to a modification of the invention, the cable drum may also be rotatably mounted on the motor housing which is then relatively stationary. The brake device may in this case be provided within a compartment between the end surfaces of the motor housing and of the cable drum, while the end of the cable for supplying the motor with current may be connected thereto by means of slip rings.

The above-mentioned as well as additional objects, features, and advantages of the present invention will become further apparent from the following detailed description thereof, particularly when the same is read with reference to the accompanying drawings, in which—

Figure 2:
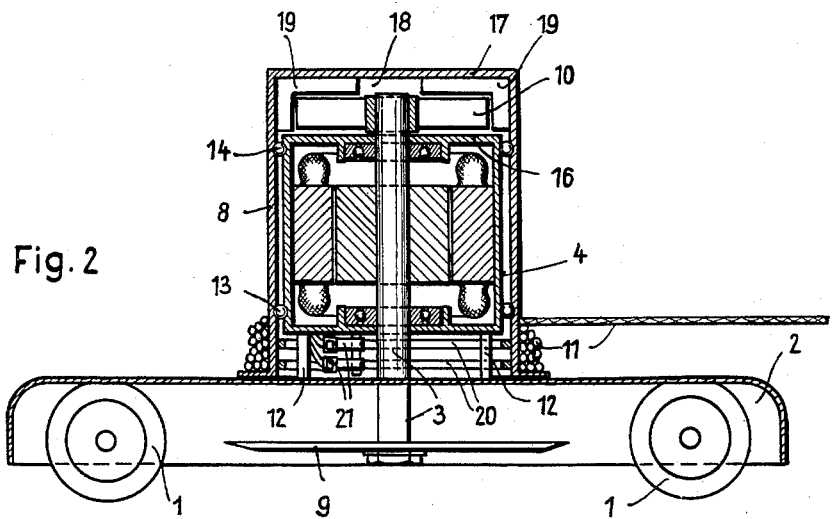

FIGURE 1 shows a side view, partly in section, of an electric lawn mower with a rotatable motor housing and a cable drum thereon; while FIGURE 2 shows a central longitudinal section of a modification of the invention in the form of a lawn mower with a stationary motor housing and a cable drum rotatably mounted on the housing.

In the drawings, the present invention has been illustrated as being applied to an electric lawn mower which is provided with a connection cable which is adapted to be wound up automatically. In both embodiments of the invention, as shown in FIGURES 1 and 2, an electric motor which is provided with a vertical shaft 3 is mounted on a frame 2 of sheet metal and is movable on wheels 1.

According to the first embodiment of the invention as shown in FIGURE 1, the housing 4 of the motor is rotatably mounted at its lower and upper ends on ball bearings 5 and 6. The lower bearing 5 is secured to frame 2, while the upper bearing 6 is secured to a bracket 7. Motor housing 4 has a cable drum 8 rigidly secured thereto. The lower end of shaft 3 of the motor carries a cutting blade 9 which is provided with a brake, for example, in the form of fan blades 10, for producing a relative rotation between the two rotatable parts, that is, the motor housing 4 including cable drum 8 and the motor armature and shaft 3 and cutting blade 9. Thus, when the motor is switched on, shaft 3 will rotate with cutting blade 9 and fan blades 10 in one direction, while the motor housing 4 will rotate at the same time in the opposite direction until cable 11 will be stretched out tightly. With the cable winding device according to the invention it is then easily possible to drive the lawn mower along the ground without danger that the mower might run over the cable or that the cable might even be cut off by the blade and the person operating the mower might then receive a severe electric shock. This danger always prevails with electric lawn mowers of prior designs which are not equipped with automatic cable winding devices. The present invention therefore insures a much safer operation of the lawn mower also in an electrical respect.

The modification of the invention, as illustrated in FIGURE 2, differs from the embodiment according to FIGURE 1 primarily by the fact that the motor housing 4 is secured in a fixed position on the machine frame 2 by means of bolts 12 and that in this case the brake is not provided on the lower end of the motor shaft 3.

The motor housing 4 according to FIGURE 2 forms the central support on which a cable drum 8 is rotatably mounted on peripheral ball bearings 13 and 14. Cable drum 8 is adapted to receive an electric cable 11 of any desired length which may be automatically wound upon drum 8 while the motor is running and will therefore always be stretched tightly. This is attained according to the invention by a slip coupling or brake which is provided between the motor shaft 3 and the rotatable cable drum 8. This slip coupling or brake consists according to FIGURE 2 of fan blades 10 which are mounted on the upper end of shaft 3 within a compartment 18 which is formed by the end walls 16 and 17 of motor housing 4 and cable drum 8, respectively. When the motor is switched on, fan blades 10 may revolve within compartment 18 either in air or within a liquid medium, for example, water or oil, in which event suitable sealing means may be provided to seal the compartment 18. Compartment 18 is provided with a number of internal projections in the form of radially extending angular members 19 which, in cooperation with the size of fan blades 10, determine the strength of the desired braking effect. In place of fan blades, it is also possible to provide a slip clutch with an adjustable degree of slippage.

In order to provide the motor with current, one end of cable 11 is connected to a pair of slip rings 20 which are mounted at the inside of cable drum 8 and provide the motor with current by means of sliding contacts 21.

The effect of the device according to the invention is that, when motor shaft 3 rotates, the brake device 10, 19 will operate like a slip coupling and will tend to take along the cable drum 8 in the same direction of rotation, whereby cable 11 will at all times be held tightly stretched in accordance with the strength to which the slip coupling or brake is adjusted.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A motor driven cable winding device comprising a frame, a bracket mounted on top of said frame, a vertical drive shaft rotatably journalled in said frame and said bracket, a motor housing containing an electric motor, said motor housing rotatably surrounding said shaft, a cable leading to said electric motor, a cable drum rigidly secured about said motor housing, an operating device carried by the lower portion of said vertical drive shaft, and brake means in the form of a fan wheel mounted on said shaft, said brake means producing a relative rotation between said shaft and said motor housing so that the motor housing rotates in the direction opposite to the direction in which said vertical drive shaft is rotated, thereby winding said cable on said cable drum until said cable is stretched out tightly.

2. A motor driven cable winding device as claimed in claim 1, further comprising ball bearings intermediate said housing and said frame and intermediate said housing and said bracket.

3. A motor driven cable winding device as claimed in claim 1, wherein said frame is provided with wheels for moving said cable winding device about.

References Cited in the file of this patent
UNITED STATES PATENTS

| | | |
|---|---|---|
| 1,326,329 | Eaton et al. | Dec. 30, 1919 |
| 2,443,763 | Dahlgren et al. | June 22, 1948 |
| 2,474,566 | Applegate | June 28, 1949 |
| 2,612,569 | Moon | Sept. 30, 1952 |